United States Patent
Aukes et al.

(10) Patent No.: US 11,124,281 B2
(45) Date of Patent: Sep. 21, 2021

(54) MECHANISMS FOR STEERING ROBOTIC FISH

(71) Applicants: Daniel Aukes, Gilbert, AZ (US); Mohammad Sharifzadeh, Phoenix, AZ (US); Kevin Nichols, Gilbert, AZ (US); Yuhao Jiang, Tempe, AZ (US)

(72) Inventors: Daniel Aukes, Gilbert, AZ (US); Mohammad Sharifzadeh, Phoenix, AZ (US); Kevin Nichols, Gilbert, AZ (US); Yuhao Jiang, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 26 days.

(21) Appl. No.: 16/655,018

(22) Filed: Oct. 16, 2019

(65) Prior Publication Data

US 2020/0115018 A1    Apr. 16, 2020

Related U.S. Application Data

(60) Provisional application No. 62/746,438, filed on Oct. 16, 2018.

(51) Int. Cl.
*B63H 1/36* (2006.01)
*B25J 9/00* (2006.01)
(Continued)

(52) U.S. Cl.
CPC ............... *B63H 1/36* (2013.01); *B25J 9/003* (2013.01); *B25J 11/00* (2013.01); *B63H 21/17* (2013.01)

(58) Field of Classification Search
CPC .. B63H 1/36; B63H 21/17; B25J 9/003; B25J 11/00
See application file for complete search history.

(56) References Cited

U.S. PATENT DOCUMENTS 9,045,211 B2 * 6/2015 Geder ...................... B63H 1/37
2004/0079844 A1 * 4/2004 Bailey ................ B23Q 11/0032
248/127

(Continued)

FOREIGN PATENT DOCUMENTS

WO    WO 03/0269954    * 4/2003    ............... B63H 1/36

OTHER PUBLICATIONS

Andersson, M., et al. (May 2015). Parameter tuned CMA-ES on the CEC'15 expensive problems. In 2015 IEEE Congress on Evolutionary Computation (CEC) (pp. 1950-1957). IEEE.

(Continued)

*Primary Examiner* — Stephen P Avila
(74) *Attorney, Agent, or Firm* — Quarles & Brady LLP

(57) ABSTRACT

In one aspect, a device for providing propulsion in water is provided by the present disclosure. The device includes a parallel mechanism including at least five rigid bars and at least five joints, each joint being positioned between two of the rigid bars and configured to allow movement of the at least five rigid bars, a first servo motor coupled to a first rigid bar included in the at least five rigid bars, a second servo motor coupled to a second rigid bar included in the at least five rigid bars, and a controller coupled to the first servo motor and the second servo motor and configured to actuate the first servo motor and the second servo motor according to a predetermined pattern.

20 Claims, 11 Drawing Sheets

(51) Int. Cl.
 B63H 21/17 (2006.01)
 B25J 11/00 (2006.01)

(56) References Cited

U.S. PATENT DOCUMENTS

2019/0176324 A1\* 6/2019 Aukes .................. B25J 9/163
2019/0225335 A1 7/2019 Zhang

OTHER PUBLICATIONS

Arastehfar, S., et al. "A relationship between sweep angle of flapping pectoral fins and thrust generation." Journal of Mechanisms and Robotics 11.1 011014 (2019).
Chen, D. et al. "Development of a soft robotic fish with BCF propulsion using MFC smart materials." 2018 37th Chinese Control Conference (CCC). IEEE, 2018.
Chen, J., et al. "Learning control for biomimetic undulating fins: An experimental study." Journal of Bionic Engineering 7 (2010): S191-S198.
Cheng, T., et al. "Untethered soft robotic jellyfish." Smart Materials and Structures 28.1 (2019): 015019.
Clark, R. P., et al. "Thrust production and wake structure of a batoid-inspired oscillating fin." Journal of fluid mechanics 562 (2006): 415.
Dewey, P. A., et al. "On the relationship between efficiency and wake structure of a batoid-inspired oscillating fin." Journal of fluid mechanics 691 (2012): 245.
Di Santo, V. et al. "Skating by: low energetic costs of swimming in a batoid fish." Journal of Experimental Biology 219.12 (2016): 1804-1807.
Doncieux, S., et al. "Evolutionary robotics: what, why, and where to." Frontiers in Robotics and AI 2 (2015): 4.
Employee, O. D. (n.d.). Bluegill Sunfish—*Lepomis macrochirus*. Retrieved online from https://web.archive.org/web/20180710084946/http://wildlife.ohiodnr.gov/species-and-habitats/species-guide-index/fish/bluegill-sunfish. Version accessed Jul. 2018.
Gibb, A. et al. "Kinematics of Pectoral Fin Locomotion in the Bluegill Sunfish *Lepomis macrochirus*." Journal of Experimental Biology 189 (1994): 133.
Hansen N., Studies in Fuzziness and Soft Computing (Springer Berlin Heidelberg, Bedin, Heidelberg, 2006), vol. 192, pp. 75-102.
Hu, Y. et al. "Parameter synthesis of coupled nonlinear oscillators for CPG-based robotic locomotion." IEEE Transactions on Industrial Electronics 61.11 (2014): 6183-6191.
Johnson, B. V. et al. "Modeling, Control and Planning for Multiple Mobile Microrobots." International Design Engineering Technical Conferences and Computers and Information in Engineering Conference. vol. 59230. American Society of Mechanical Engineers, 2019.
Jones, E. A., et al. "Efficiency of Labriform Swimming in the Bluegill Sunfish (*Lepomis macrochirus*).(Report)." Journal of Experimental Biology 210.19 (2007): 3422-3429. Web.
Katzschmann R. K., et al., Experimental Robotics III, T. Yoshikawa, F. Miyazaki, eds. (Springer Berlin Heidelberg, Berlin, Heidelberg, 2016), vol. 200 of Lecture Notes in Control and Information Sciences, pp. 405-420.
Katzschmann, R. K., et al. (2018). Exploration of underwater life with an acoustically controlled soft robotic fish. Science Robotics, 3(16).
Lauder, G. V., et al. (2006). Learning from fish: kinematics and experimental hydrodynamics for roboticists. International journal of automation and computing, 3(4), 325-335.
Lauder, G. V., et al. "Fish biorobotics: kinematics and hydrodynamics of self-propulsion." Journal of experimental biology 210.16 (2007): 2767-2780.
Li, T., et al. (2017). Fast-moving soft electronic fish. Science Advances, 3(4), e1602045.
Li, Z., et al. "Turning characteristics of biomimetic robotic fish driven by two degrees of freedom of pectoral fins and flexible body/caudal fin." International Journal of Advanced Robotic Systems 15.1 (2018): 1729881417749950.
Liu, J., et al. (2010). Biological inspiration: from carangiform fish to multi-joint robotic fish. Journal of bionic engineering, 7(1), 35-48.
Low, K. H., et al. "Parametric study of the swimming performance of a fish robot propelled by a flexible caudal fin." Bioinspiration & Biomimetics 5.4 (2010): 046002.
Ma, H., et al. "On the equivalences and differences of evolutionary algorithms." Engineering Applications of Artificial Intelligence 26.10 (2013): 2397-2407.
Marchese, A. D., et al. (2014). Autonomous soft robotic fish capable of escape maneuvers using fluidic elastomer actuators. Soft Robotics, 1(1), 75-87.
Niu, X., et al. "Locomotion learning for an anguilliform robotic fish using central pattern generator approach." IEEE Transactions on Industrial Electronics 61.9 (2014): 4780-4787.
Omidvar MN, et al, Lecture Notes in Computer Science (including subseries Lecture Notes in Artificial Intelligence and Lecture Notes in Bioinformatics) (2010), vol. 6464 LNAI, pp. 303-312.
Ouerfelli, M., et al. "Optimization of a spherical five-bar parallel drive linkage." Journal of mechanical design (1990) 116.1 (1994): 166-173.
Park, S.-J., et al. "Phototactic guidance of a tissue-engineered soft-robotic ray." Science 353.6295 (2016): 158-162.
Ren, Q., et al. "A gim-based biomimetic learning approach for motion generation of a multi-joint robotic fish." Journal of Bionic Engineering 10.4 (2013): 423-433.
Robertson AE. Invasive 'Devil Fish' Plague Mexico's Waters. Can't Beat 'Em? Eat 'Em. Article. Oct. 18, 2017. https://www.npr.org/sections/thesalt/2017/10/18/557599300/invasive-devil-fish-plague-mexicos-waters-cant-beat-em-eat-em.
Sharifzadeh, M., et al. "An integrated design and simulation environment for rapid prototyping of laminate robotic mechanisms." ASME 2018 International Design Engineering Technical Conferences and Computers and Information in Engineering Conference. American Society of Mechanical Engineers Digital Collection, 2018.
Sharifzadeh, M., et al. "On Locomotion of a Laminated Fish-inspired robot in a Small-to-size Environment." International Design Engineering Technical Conferences and Computers and Information in Engineering Conference. vol. 51807. American Society of Mechanical Engineers, 2018.
Sitorus, P., et al. (2009). Design and Implementation of Paired Pectoral Fins Locomotion of Labriform Fish Applied to a Fish Robot. Journal of Bionic Engineering , 6(1), 37-45.
Tan, X. (2011). Autonomous robotic fish as mobile sensor platforms: Challenges and potential solutions. Marine Technology Society Journal, 45(4).
Veenstra F., et al. Proceedings of the Genetic and Evolutionary Computation Conference on—GECCO '18 (ACM Press, New York, New York, USA, 2018), pp. 157-164.
Verma, S. et al. "Analytic modeling for precise speed tracking of multilink robotic fish." IEEE Transactions on Industrial Electronics 65.7 (2018): 5665-5672.
Vo, T. Q., et al. "Propulsive velocity optimization of 3-joint fish robot using genetic-hill climbing algorithm." Journal of Bionic Engineering 6.4 (2009): 415-429.
Volunteer. (n.d.). Bluegill Sunfish . Accessed online from Fishes of Boneyard Creek: https://web.archive.org/web/20180828210314/http://fishesofboneyardcreek.weebly.com/bluegill-sunfish.html.I Version accessed Aug. 2018.
Wang, W., et al. "Three-dimensional modeling of a fin-actuated robotic fish with multimodal swimming." IEEE/ASME Transactions on Mechatronics 23.4 (2018): 1641-1652.
Xu, D., et al. (2018). A stiffness adjustment mechanism based on negative work for high-efficient propulsion of robotic fish. Journal of Bionic Engineering, 15(2), 270-282.
Yu, J., et al. "Motion control strategies for a repetitive leaping robotic dolphin." IEEE/ASME Transactions on Mechatronics 24.3 (2019): 913-923.

(56) References Cited

OTHER PUBLICATIONS

Yu, J., et al. (2018). Motion control and motion coordination of bionic robotic fish: A review. Journal of Bionic Engineering, 15(4), 579-598.
Yu, J., et al. "CPG network optimization for a biomimetic robotic fish via PSO." IEEE transactions on neural networks and learning systems 27.9 (2016): 1962-1968.
Yu, J., et al. "Development of a biomimetic robotic fish and its control algorithm." IEEE Transactions on Systems, Man, and Cybernetics, Part B (Cybernetics) 34.4 (2004): 1798-1810.
Yu, J., et al. "Development of a fast-swimming dolphin robot capable of leaping." IEEE/ASME Transactions on Mechatronics 21.5 (2016): 2307-2316.
Zhang, S., et al. "Design and control of an agile robotic fish with integrative biomimetic mechanisms." IEEE/ASME Transactions on Mechatronics 21.4 (2016): 1846-1857.
Zhang, Y., et al. (2012). Parametric Study of an Underwater Finned Propulsor Inspired by Bluespotted Ray. Journal of Bionic Engineering , 9 (2), 166-176 .
Zhong, Y. et al. "A novel robot fish with wire-driven active body and compliant tail." IEEE/ASME Transactions on Mechatronics 22.4 (2017): 1633-1643.
Zhou, C. et al. "Design and locomotion control of a biomimetic underwater vehicle with fin propulsion." IEEE/ASME Transactions on Mechatronics 17.1 (2011): 25-35.
Zhou, C. et al. "On-line optimization of biomimetic undulatory swimming by an experiment-based approach." Journal of Bionic Engineering 11.2 (2014): 213-225.
U.S. Appl. No. 16/830,993, filed Mar. 26, 2020, Zhang et al.
U.S. Appl. No. 16/900,441, filed Jun. 12, 2020, Emami et al.

\* cited by examiner

MECHANISMS FOR STEERING ROBOTIC FISH

This application is based on, claims priority to, and incorporates herein by reference in its entirety, U.S. Provisional Application No. 62/746,438, filed Oct. 16, 2018, and entitled "Mechanisms For Steering Robotic Fish."

BACKGROUND

Algae and other unwanted plant growth is a growing problem in many bodies of water throughout the world. A robotic fish capable of clearing this growth is envisioned. In order to make the robotic fish viable, an effective, low cost propulsion system is required. Prior methods have utilized bio-inspired examples as a basis for robotic propulsion. Methods for steering the robotic fish may utilize a robotic tail caudal fin, primarily for locomotion, and one or more robotic pectoral fins for steering and maneuvering. However, previous methods of robotically modeling a pectoral fin have had drawbacks of low performance or high cost.

One prior example of a robotic pectoral fin design from the University of Science and Technology of China utilized eight servo motors, each attached to an active bar made from a rigid material. The design was based on a Blue Spotted Ray. The rigid bars were attached to a thin latex sheet. The fin then steered a robotic fish by actuating the servo motors. However, this design is expensive, as it utilizes eight servo motors per pectoral fin. Current solutions typically do not permit multiple rotational degrees of freedom within a single fin, or require a complex mechanical linkage facilitated by precision-machined parts.

A device that effectively steers and maneuvers a robotic fish at an affordable cost is therefore desired.

SUMMARY

Systems and methods of a robotic fish device that uses an improved pectoral fin device to efficiently steer and maneuver a robotic fish at an affordable cost are described herein. In one aspect, a device for providing propulsion in water is provided by the present disclosure. The device includes a parallel mechanism including at least five rigid bars and at least five joints, each joint being positioned between two of the rigid bars and configured to allow movement of the at least five rigid bars, a first servo motor coupled to a first rigid bar included in the at least five rigid bars, a second servo motor coupled to a second rigid bar included in the at least five rigid bars, and a controller coupled to the first servo motor and the second servo motor and configured to actuate the first servo motor and the second servo motor according to a predetermined pattern.

In the device, the at least five joints can be evenly spaced around the parallel mechanism.

In the device, the at least five joints can include a fabric.

In the device, the predetermined pattern can include a sinusoidal pattern.

In the device, a third rigid bar included in the at least five rigid bars can be coupled to a substrate, the third rigid bar being positioned between the first rigid bar and the second rigid bar, and the first servo motor and the second servo motor can be coupled to the substrate.

In the device, the third rigid bar can be attached to the substrate via a structural member.

The device can further include a fin attached to a fourth bar of the at least five rigid bars and extending orthogonally away from the parallel mechanism, the fourth bar positioned adjacent to the first rigid bar, and the fourth bar moving when the first rigid bar moves.

In the device, the pattern can be determined based on predetermined parameters corresponding to a swimming maneuver, and the predetermined pattern can include a series of angular positions for the first servo motor and the second servo motor.

The device can be included in a robotic fish.

In the device, the at least five joints can include nylon.

The device can further include a fin coupled to a third rigid bar included in the at least five rigid bars. The fin can be configured to provide a turning force to a submersible robot. The fin can be configured to provide a locomotion force to a submersible robot.

In another aspect, a robotic fish is provided by the present disclosure. The robotic fish includes a parallel mechanism comprising at least five rigid bars, a first servo motor coupled to a first rigid bar included in the at least five rigid bars, a second servo motor coupled to a second rigid bar included in the at least five rigid bars, a fin coupled to a third rigid bar included in the at least five rigid bars; and a controller coupled to the first servo motor and the second servo motor and configured to actuate the first servo motor and the second servo motor according to a predetermined pattern in order to provide a turning force to the robotic fish.

In the robotic fish, the parallel mechanism can include at least five joints, each joint being positioned between two of the rigid bars and configured to allow movement of the at least five rigid bars. The at least five joints can be evenly spaced around the parallel mechanism. The at least five joints can include a fabric.

In the robotic fish, the predetermined pattern can include a sinusoidal pattern.

The robotic fish can further include a caudal fin coupled to a third servo motor, and the controller can be further coupled to the third servo motor and configured to actuate the third servo motor in a second predetermined pattern in order to provide a locomotion force to the robotic fish.

In the robotic fish, the fin can extend orthogonally away from the parallel mechanism.

The present disclosure provides devices and methods that use two motors, such as servo motors, and a two Degrees of Freedom (DOF) parallel mechanism to steer a robotic fish. In particular, the parallel mechanism accurately mimics the rotational movement of a fish's pectoral fin. The two degrees of freedom refer to two active bars of the mechanism. These bars may be actuated by an actuator such as a motor, pneumatic piston, hydraulic piston, or other actuation methods known in the art. The mechanism may have one or more passive bars. For example, a 5-bar mechanism may have two active and three passive bars. One or more hinge layers may be interposed between the bars. The hinge layer allows all the bars to move as a result of actuation of the active bars. A fin may be attached to the parallel mechanism. The fin may be attached to a passive joint. The actuators may be controlled by a controller configured to move the actuators in a pattern that allows the mechanism and/or fin to mimic the motion of a fish's pectoral fin. This device allows a robotic fish to be steered.

The laminate fabrication process described in this disclosure permits multiple degrees of freedom with a less expensive fabrication process that produces multiple rotational degrees of freedom. This permits the pectoral fin to rotate about multiple axes simultaneously to (potentially) create more complex swimming motions such as turning, diving, and forward swimming.

The foregoing and other advantages of the invention will appear from the following description. In the description, reference is made to the accompanying drawings, which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION

In one aspect, the present disclosure provides a device including a parallel mechanism, a first actuator, a second actuator, a fin, and a controller. The parallel mechanism comprises a first rigid layer, a hinge layer, a second rigid layer, two active bars, and a plurality of passive bars. The first actuator is attached to a first active bar of the parallel mechanism. The second actuator is attached to a second active bar of the parallel mechanism. The controller is configured to move the actuators in a pattern that allows the parallel mechanism and/or fin to mimic the motion of a fish's pectoral fin.

Embodiments of systems, devices, and methods in accordance with the present disclosure provide a device using two actuators, and a two Degrees of Freedom (DOF) parallel mechanism to steer a robotic fish. In particular, the parallel mechanism accurately mimics the rotational movement of a fish's pectoral fin. An exemplary embodiment of a steering device for a robotic fish includes two servo motors and a parallel mechanism with two active bars. The two active bars may be actuated individually by one of the servo motors. The parallel mechanism may be attached to a fin such as a pectoral or side fin in order to apply a force created by the mechanism to the fin in order to propel and/or steer the robotic fish. The parallel mechanism used in conjunction with the side fin may be used with an opposing side fin as well as in conjunction with a tail fin to create natural-looking swimming motion similar to how a fish swims. The additional degrees of freedom provided by this joint can permit the fish to maneuver in novel ways that other fish robots have not yet demonstrated.

Figure 1:
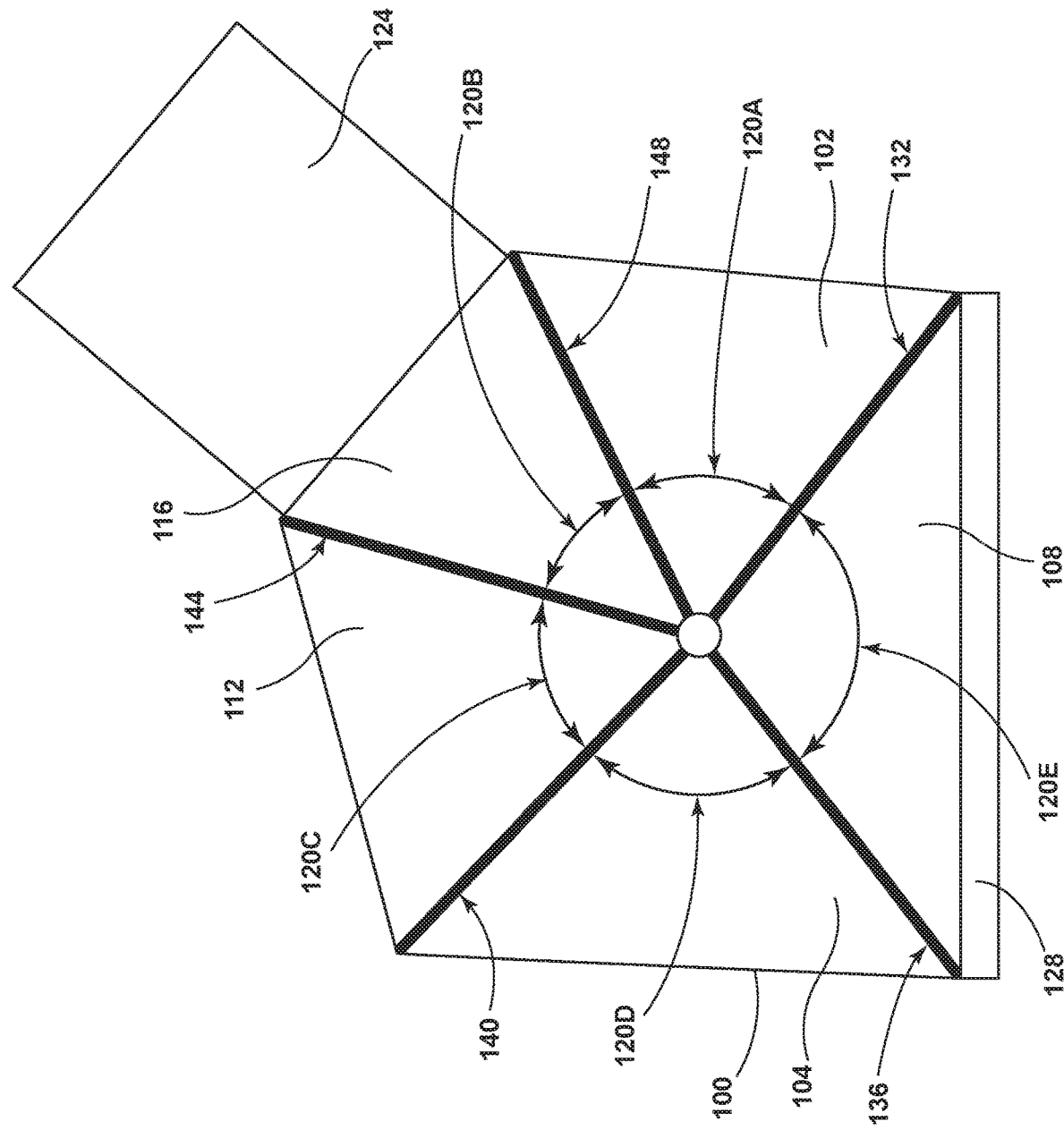
FIG. 1 is a diagram of a five-bar parallel mechanism in accordance with the present disclosure.

Referring now to FIG. 1, an exemplary five-bar rotational mechanism 100 mimics the rotational movement of fish's pectoral fin. The exemplary mechanism 100 is a 2 Degrees of Freedom (DOF) parallel mechanism that consists of a five bars loop with two active bars including a first active bar 102 and a second active bar 104 and three passive bars including a first passive bar 108, a second passive bar 112, and a third passive bar 116. A design parameter of the mechanism is the angle between each hinge ($\theta_r$) as indicated by angles 120A-E. The angle between each hinge can be the angle between the centerline of each hinge. A fin 124 can be coupled to the five-bar rotational mechanism 100. More specifically, the fin 124 can be coupled to two bars such as the second passive bar 112 and the third passive bar 116. The five-bar rotational mechanism 100 can include a first active joint 132, a second active joint 136, a first passive joint 140, a second passive joint 144, and a third passive joint. The first active joint 132 can be connected to the first active bar 102 and the first passive bar 108, which may also be referred to as a ground bar. The second active joint 136 can be connected to the second active bar 104 and the first passive bar 108. The first passive joint 140 can be connected to the second active bar 104 and the second passive bar 112. The second passive joint 144 can be connected to the third passive bar 116 and the second passive bar 112. The third passive joint 148 can be connected to the third passive bar 116 and the first active bar 102.

The joints can be a flexible material that allows the bars, which can be include rigid materials, to move relative to the other bars. The active bars 102 and 104 can each be coupled to an actuator (not shown) such as a servo motor and actuated as will be explained below. The first passive bar 108 can be coupled to a substrate 128 such as a fish body and fixed in place. The substrate is a component of a device being propelled by the five bar mechanism 100, such as a submersible robot such as a robotic fish. The active bars 102 and 104 can then move and affect the movement of the fin 124, as will be explained below.

In order to simulate the motion of an exemplary five bar mechanism with joints evenly spaced around the five bar mechanism with symmetric 72 degree angles in-between (e.g. 72 degrees at the angles 120A-E), a script such as a python script may be used. In this script, the position of the two fixed joints (e.g., the active joints 132, 136) which form the ground bar (e.g., passive bar 108) and the angles between joints are defined. Furthermore, the angle between ground bar 108 and the two active bars 102, 104 in an array of step iteration can be defined. An optimization method can be used to find the configuration of five-bar mechanism which match the current step angles. During this calculation process, all the other bars' angles will be obtained and if the optimization error is within an acceptable level of margin, the configuration will be considered as a result. The script can simulate the work space of the mechanism 100 when both of the active bars' angles are changing from −175 degrees to +175 degrees.

Jacobian calculations can be used to find an output path of a fin of a fish from the data generated by mapping the reference points. In the case of a Bluegill, an output path that is sinusoidal is needed to accurately mimic the Bluegill pectoral fin motion.

Elements of an exemplary five bar mechanism can be coded in a script to determine if the mechanism is capable of producing a sinusoidal output path of motion. These elements are the constraints that defined each of the five vectors that made up the five-bar mechanism. After defining all five vectors, the program was run through a series of angles to determine the points at each input angle. The program indicated that the mechanism is capable of producing a sinusoidal output path of motion.

Figure 2:
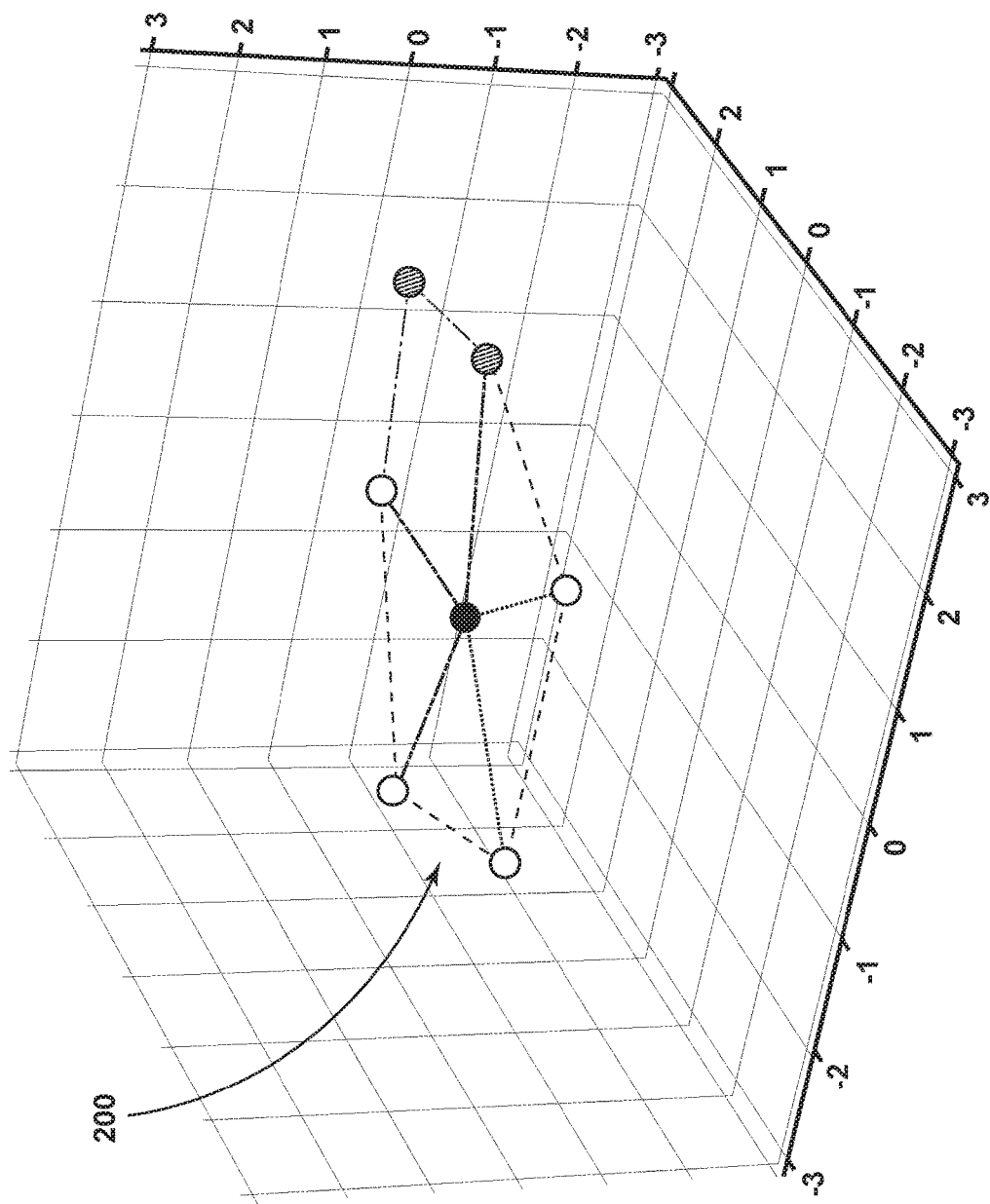
FIG. 2 is a model of a 5-bar mechanism, with a focal point added.

Referring now to FIG. 2, the five bar mechanism 200 with symmetric 72 degree angles between each joint was recreated in a modeling program with focal point added for a study of forces and velocities generated by the mechanism. An addition of a focal point of study was added to the existing Jacobian study of the five bar mechanism. Information about masses and gravity can be defined so the force vectors in the X, Y, and Z direction can be calculated. Then a script can run through a series of angle of motion to determine the torque the exemplary system would expect to experience. In this five bar mechanism, it was found that the expected torque each of the hinge motors would encounter would be 0.0395 Nm. The velocities of the motors of the system can then be found by using the power that the Bluegill pectoral fin uses 16.5 W/kg and the calculated torque. In this embodiment, the exemplary system should expect an average velocity of 2.87 m/s. This data can be used to determine an appropriate motor for the system.

Figure 3:
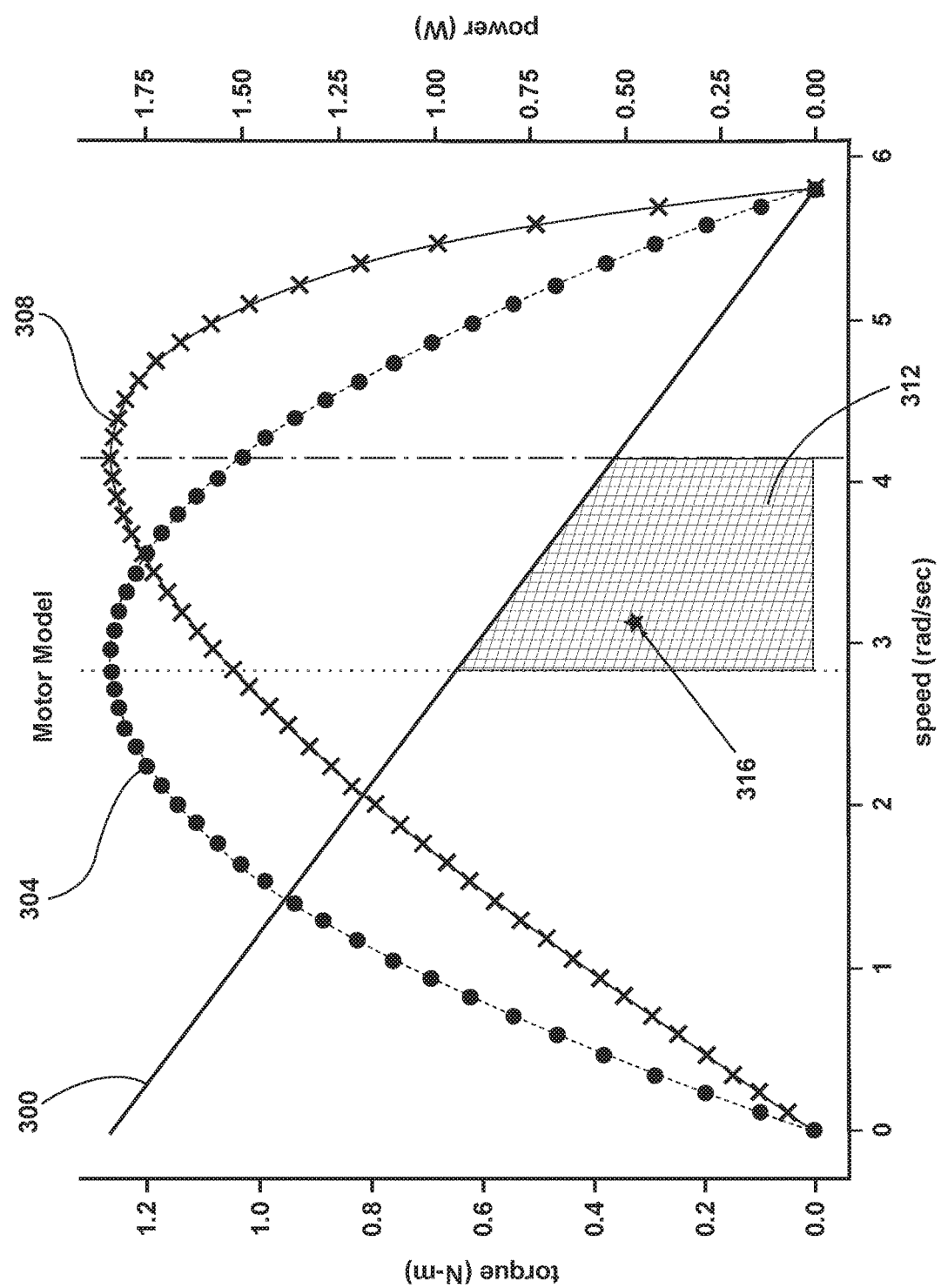
FIG. 3 is a motor model graph.

Referring now to FIG. 3, a motor model graph with a Speed-Torque curve 300, a Mechanical Power curve 304, and a Motor Efficiency curve 308 for a HiTec servo #HS-5646WP motor is shown. To analyze if a servo motor is appropriate for a parallel mechanism, technical information regarding the motor can be used in conjunction with the previously determined torque and velocity information to do analytic analysis. Using a motor's specifications on angular velocity, stall torque, and current draw, three graphs can be calculated using methods known in the art. These three graphs are speed-torque, mechanical power, and motor efficiency graphs. These three graphs form a region of optimal performance for the motor which is a gridiron area 312 of the graph in FIG. 3. A star 316 within the gridiron region 312 of the graph is the maximum torque/speed that was previously determined that a certain system would be needing. If the system predicted requirements fall within the gridiron region 312 for the proposed motor, then the motor may be appropriate for the parallel mechanism. For example, a HiTec servo number HS-5646WP may be used for the exemplary parallel mechanism with symmetric 72 degree angles between each joint.

Figure 4:
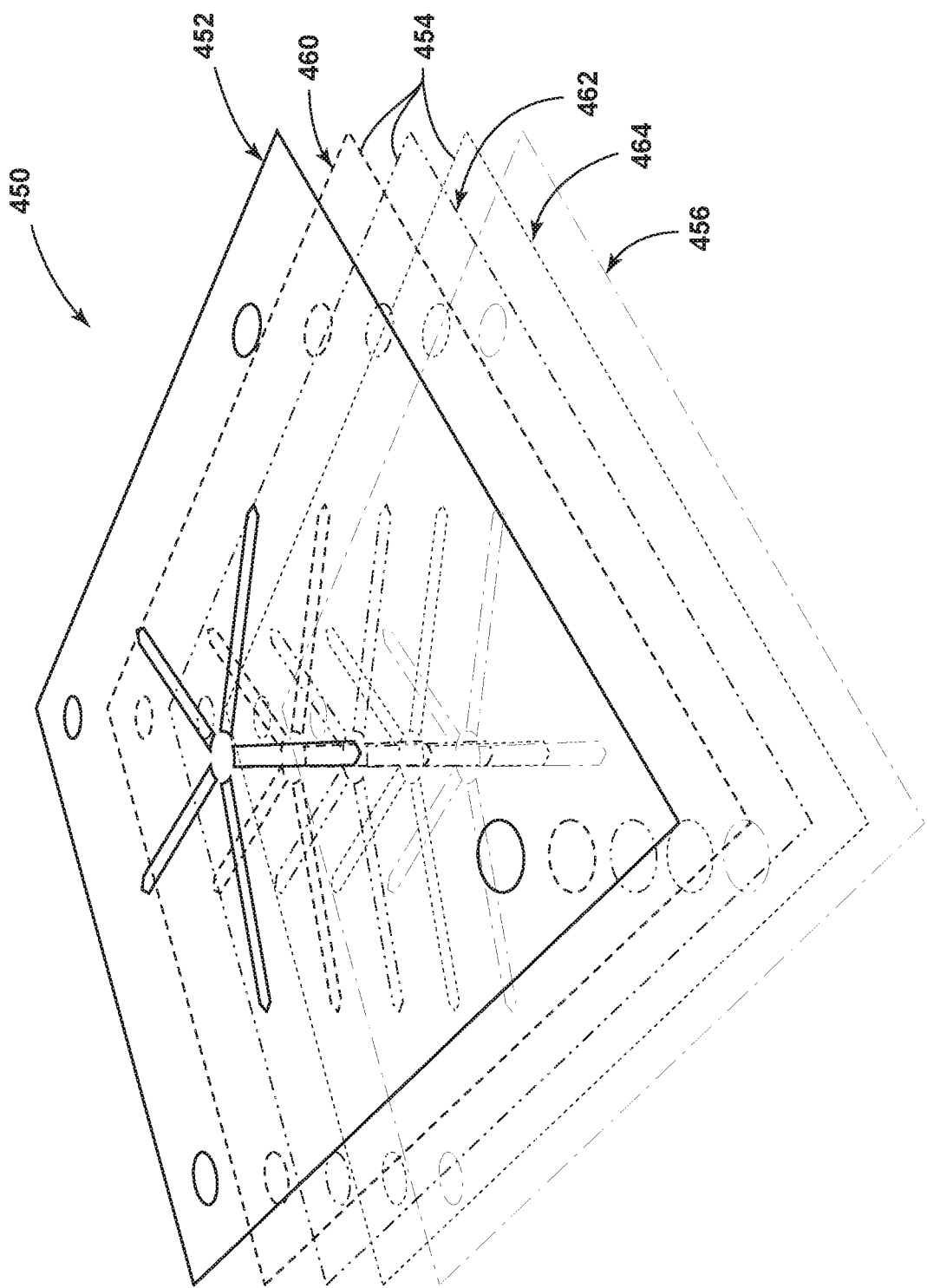
FIG. 4 is a diagram of manufacture layers of an example 5-bar mechanism.
Figure 5A:
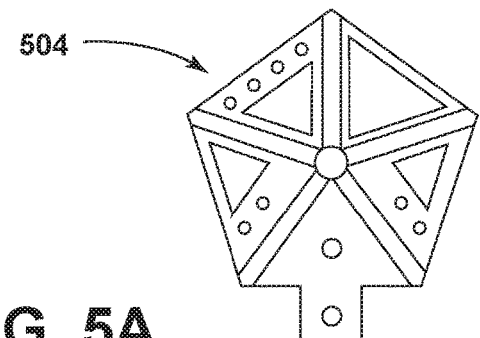
FIG. 5A is a mechanism with five bars, one fin attachment and a plurality of water holes.
Figure 5B:
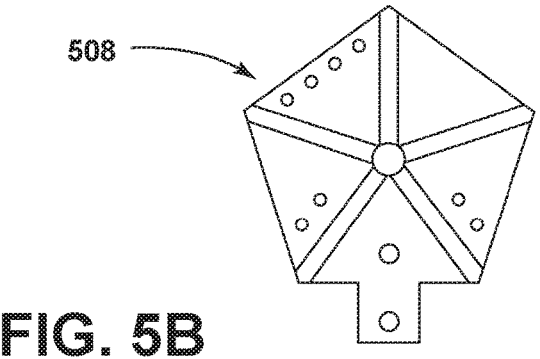
FIG. 5B shows a mechanism with five bars and one fin attachment.
Figure 5C:
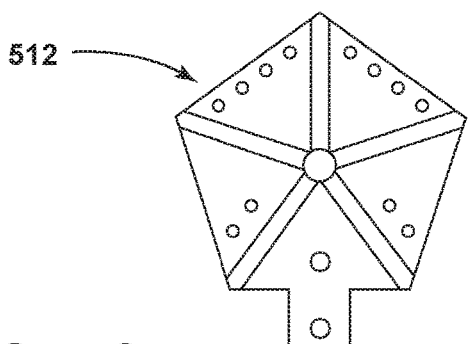
FIG. 5C shows a mechanism with five bars and two fin attachments.
Figure 5D:
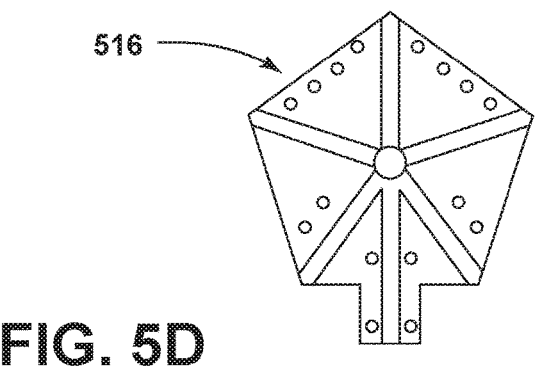
FIG. 5D shows a mechanism with six bars and two fin attachments.
Figure 5E:
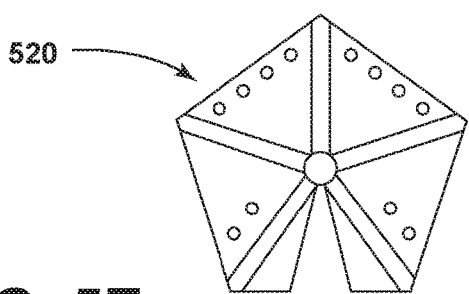
FIG. 5E shows a mechanism with five bars and an extra angle.
Figure 5F:
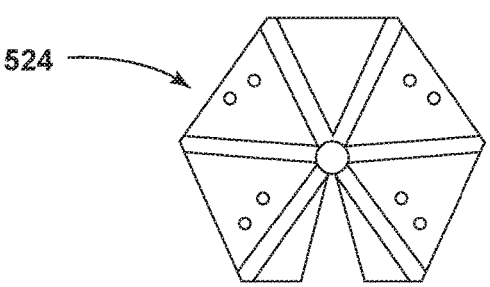
FIG. 5F shows a mechanism with six bars and an extra angle.
Figure 5G:
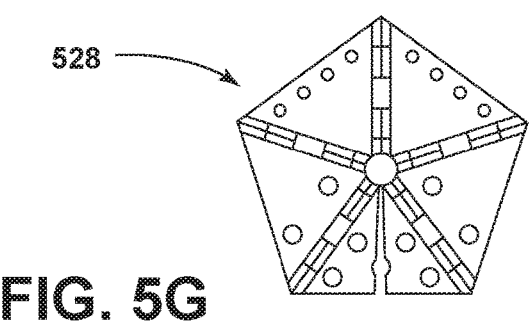
FIG. 5G shows a mechanism with six bars, an extra angle, and supported hinges.
Figure 5H:
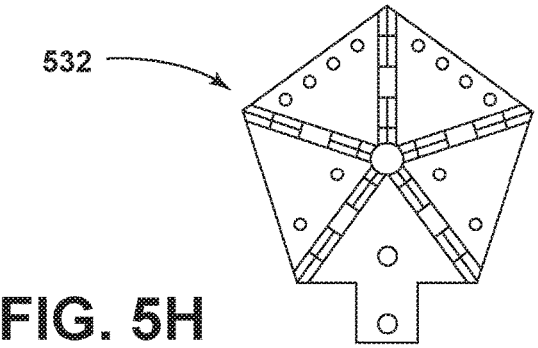
FIG. 5H shows a mechanism with five bars and supported hinges.

Referring now to FIG. 4, an exemplary 5-bar mechanism 450 is shown. The 5-bar mechanism 450 may have a plurality of layers. In one embodiment, there may be a 5-bar mechanism 450 with three layers. A first layer 452 may be a rigid layer. A second layer 454 may be a hinge layer. A third layer 456 may be a rigid layer. The rigid layers 452, 456 may be composed of acrylic, fiberglass, or any other rigid material suitable for use in water. The rigid layers 452, 456 may have hinge lines cut at predetermined angles. The hinge layer 454 may be composed of one or more layers of materials that are flexible enough to function as a hinge between bars and/or are relatively waterproof. In some embodiments, the hinges may be made from a three layer composition including a fabric layer 460, a polyester layer 462, and another fabric layer 464 of the same or different fabric, to increase the durability of the hinge. The fabric can be made from nylon, for example. The fabric and polyester layers function as a hinge between bars. The 5-bar mechanism 450 may be manufactured using 4-d printing. In another embodiment, a 5-bar mechanism may consist of 5 bars made of rigid material, with a hinge layer interposed between bars. The hinge layer may be disposed between the bars and attached to the bars using glue, mechanical fasteners, or any other appropriate method known in the arts. In some embodiments, the hinge layer 454 can be sandwiched between rigid layers 452, 456 in order to constrain rotational motion of the 5-bar mechanism 450 to a desired axis of rotation. The rigid material can be a thin, rigid material, but other geometries can be used, provided any relatively thicker geometries do not produce interference with neighboring parts.

Briefly referring to FIG. 1 as well as FIG. 4, the active and passive joints in the five bar mechanism 100, such as the first passive joint 140 and the first active joint 132, can be formed by portions of the hinge layer 454 that are not connected to the rigid layers 452, 456, or in other words, the portions of the hinge layer 454 not sandwiched by the rigid layers 452, 456. The active and passive bars, such as the first active bar 102 and the first passive bar 108, can be formed by portions of the hinge layer 454 that are connected to the rigid layers 452, 456, or in other words, the portions of the hinge layer 454 that are sandwiched by the rigid layers 452, 456.

Referring now to FIG. 5, various embodiments of two Degrees of Freedom (DOF) parallel mechanisms are shown. FIG. 5A shows a mechanism 504 with five bars, one fin attachment and a plurality of water holes. FIG. 5B shows a mechanism 508 with five bars and one fin attachment. FIG. 5C shows a mechanism 512 with five bars and two fin attachments. FIG. 5D shows a mechanism 516 with six bars and two fin attachments. FIG. 5E shows a mechanism 520 with five bars and an extra angle. FIG. 5F shows a mechanism 524 with six bars and an extra angle. FIG. 5G shows a mechanism 528 with six bars, an extra angle, and supported hinges. FIG. 5H shows a mechanism 532 with five bars and supported hinges. Mechanisms with an extra angle, such as the mechanisms of FIGS. 5E-G, can avoid some mechanical singularities, which can improve performance.

Figure 6:
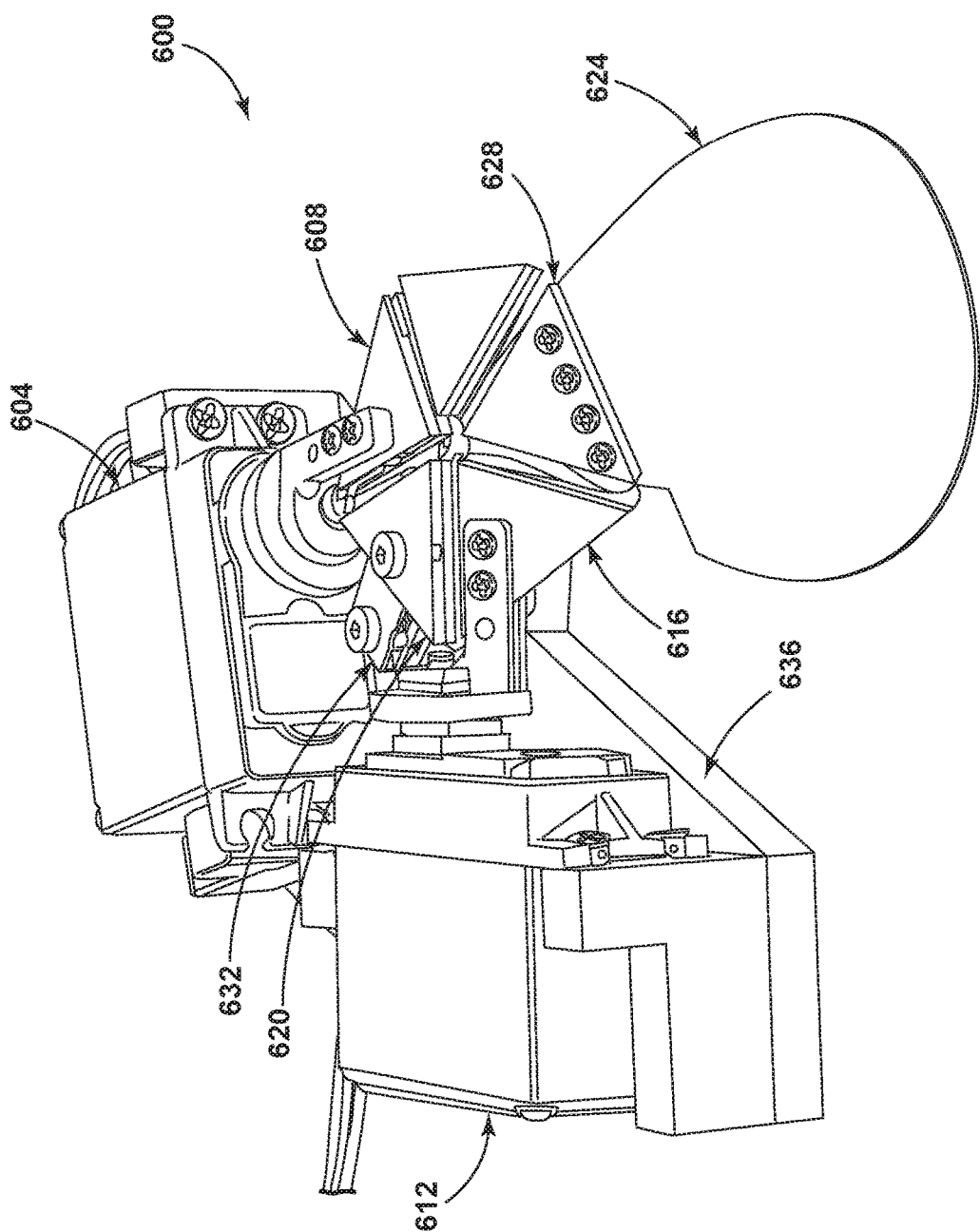
FIG. 6 is a top perspective view of an example embodiment of a pectoral fin device.

Referring now to FIG. 6, an exemplary embodiment of a pectoral fin device 600 is shown. The device 600 includes a first servo motor 604 attached to a first active bar 608 and a second servo motor 612 attached to a second active bar 616, a first passive bar 620 in between the active bars 608, 616, and a fin 624 attached to a second passive bar 628. The first passive bar 620 is also known as a ground bar because it is attached to a structural member 632 which is attached to a substrate 636 along with the servo motors 604, 612, and does not move, thereby coupling the first passive bar 620 to the substrate 636 and preventing movement of the first passive bar 620. The substrate can also prevent movement of the servo motors 604, 612. The substrate 636 can be a portion of a body of a submersible robot such as a robotic fish. The pectoral fin device 600 is thereby coupled to the substrate 636 by the attachments to the servo motors 604, 612, and the structural member 632. The submersible robot can be propelled by the pectoral fin device 600.

Figure 7:
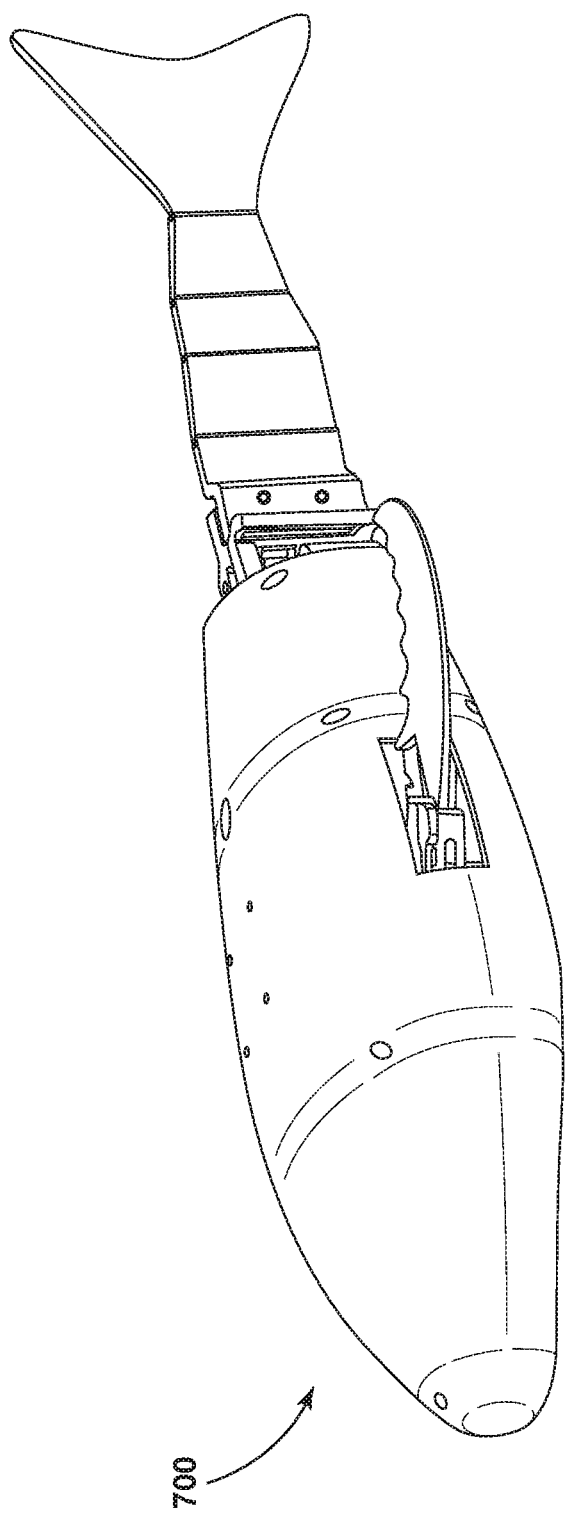
FIG. 7 is a side perspective view of an example robotic fish having a pectoral fin device in accordance with the present disclosure.

Referring now to FIG. 7, an application of a device that mimics the motion of a fish's pectoral fin is shown. A robotic fish 700 contains two pectoral fin devices (one not shown). The robotic fish 700 is a submersible robot. The pectoral fin devices are included for steering as the caudal fin is primarily for locomotion of the robot. The pectoral fin devices also may provide locomotion.

EXAMPLES

Example 1: Experimental Validation Procedure

Figure 8:
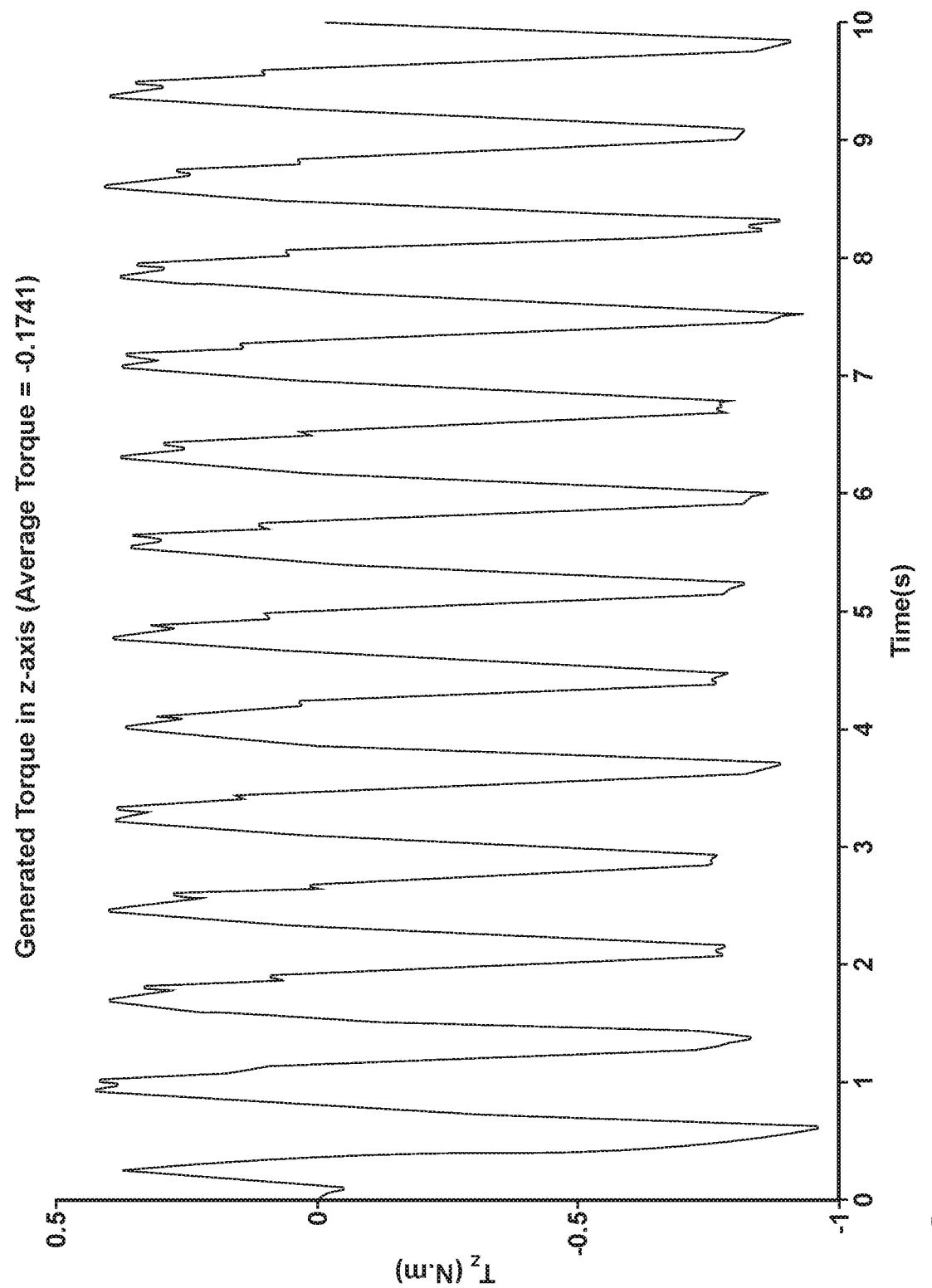
FIG. 8 is a graph of exemplary data of collected torque values from an experiment.

An exemplary test for validating various designs of parallel mechanisms is disclosed. As experimental test, the Pectoral fin mechanism is mounted to a torque sensor to record and evaluate the different torque load experienced during fin's motion in water and/or under water. To this end, a plate is design to offset the fin mechanism from the sensor attachment rod. In design of the latter plate, the angle of attachment is the same with the final bar design, while the distance is increased in order to scale the forces. This is useful for increasing signal to noise ratio in force-torque sensor. Exemplary data of the collected torque values is shown in FIG. 8. It should be mentioned that as the force-torque sensor is 6-axis sensor, it is possible to study all the generated force amounts and directions. This makes it possible to define different objectives and find the optimal maneuver for each one.

Training Algorithm

In order to find the best working regime of the fin understudy, some experimental test will be designed and accomplished. To this end, performance each working regime of the fin actuators will be validated by how much force and torque the fin generates in each directions. Based on this, different cost functions can be studied and different propulsion can be find for each cost functions. Due to usage of 5-bar mechanism, 7 parameters are defined to parameterize actuators movement. The parameters are the variables of the following formulas.

$$\beta_1 + \alpha_1 \sin(2\pi t) \quad (1)$$

$$\beta_2 + \alpha_2 \sin(2\pi t + \phi) \quad (2)$$

Formulas 1 and 2 are the movement of the first and second servo motors respectively. As just 10 values for each parameter will result in $10^7$ tests, a smart search process is used in order to find the best working regime.

In this study an evolution strategy called Covariance Matrix Adaptation Evolution Strategy (CMAES) may be used. To this end, a Matlab code of the algorithm can be prepared. This code calls on a computer function to actuate the mechanism actuators and collecting the generated forces by fin propulsion. The computer function is created by methods know in the arts. Since the algorithm is going to be implemented experimentally, some extra pre-process items should be considered. These considerations are due to the fact that although all the parameters of actuators are independent, there is feasible range within each actuator are dependent. For example, for each actuator, not only the amplitude and offset should be smaller than the maximum moving range of the actuator (180°), their summation should also be smaller than the maximum range. In addition, the feasible range of amplitude and frequency of each servo is related to each other due to maximum moving speed of servo. Lack of considerations of these feasible ranges dependencies may result in damage to the actuators. In order to consider the latter dependencies, the parameter values estimated by CMAES is checked to meet the feasibility conditions. If a parameter is not feasible, the algorithm will return infinite as the cost value while skipping the actual experimental test. It should be mentioned that since the objective of pectoral fins implementation is to help the robotic fish with sharp turns, the cost function is selected as maximizing generated torque in z-axis direction.

Results

Figure 9:
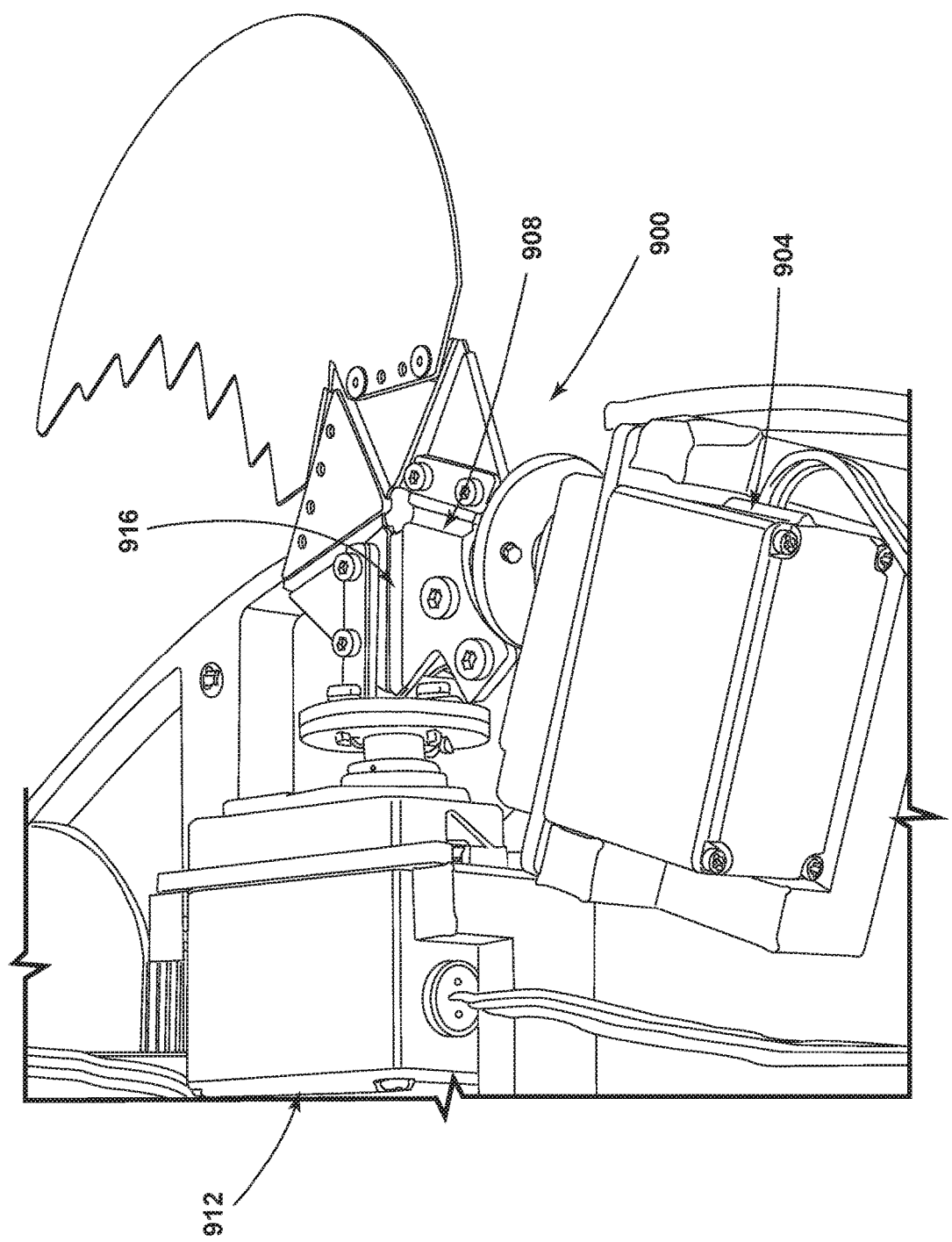
FIG. 9 is a top perspective view of an example servo horn attached to a servo motor.

Referring to FIG. 9, a five bar mechanism 900 is shown. Through the research conducted in this project, different designs for the pectoral fin mechanism were proposed, built and tested. These designs were across many different parts including rotational mechanism, servo horns, mechanism ground holder and fin designs. It should be mentioned that the final 5-bar mechanism 900 has symmetric 72 degrees joint angles. Moreover, it has a 9 layer design for strengthening the flex layer. To this end, the polyester flex layer is laminated between to fabric layers via two adhesive layers. In the final design, all the parts are aligned based on the 5-bar mechanism and the motor brackets and ground holder is 3D printed. The axis of each servo motor is aligned with the centerline of each hinge or joint. A first servo motor 904 is aligned with a first joint 908, and a second servo motor 912 is aligned with a second joint 916. Each servo is connected by its custom-made servo horn to its corresponding bar. This setup is shown in FIG. 9.

Figure 10:
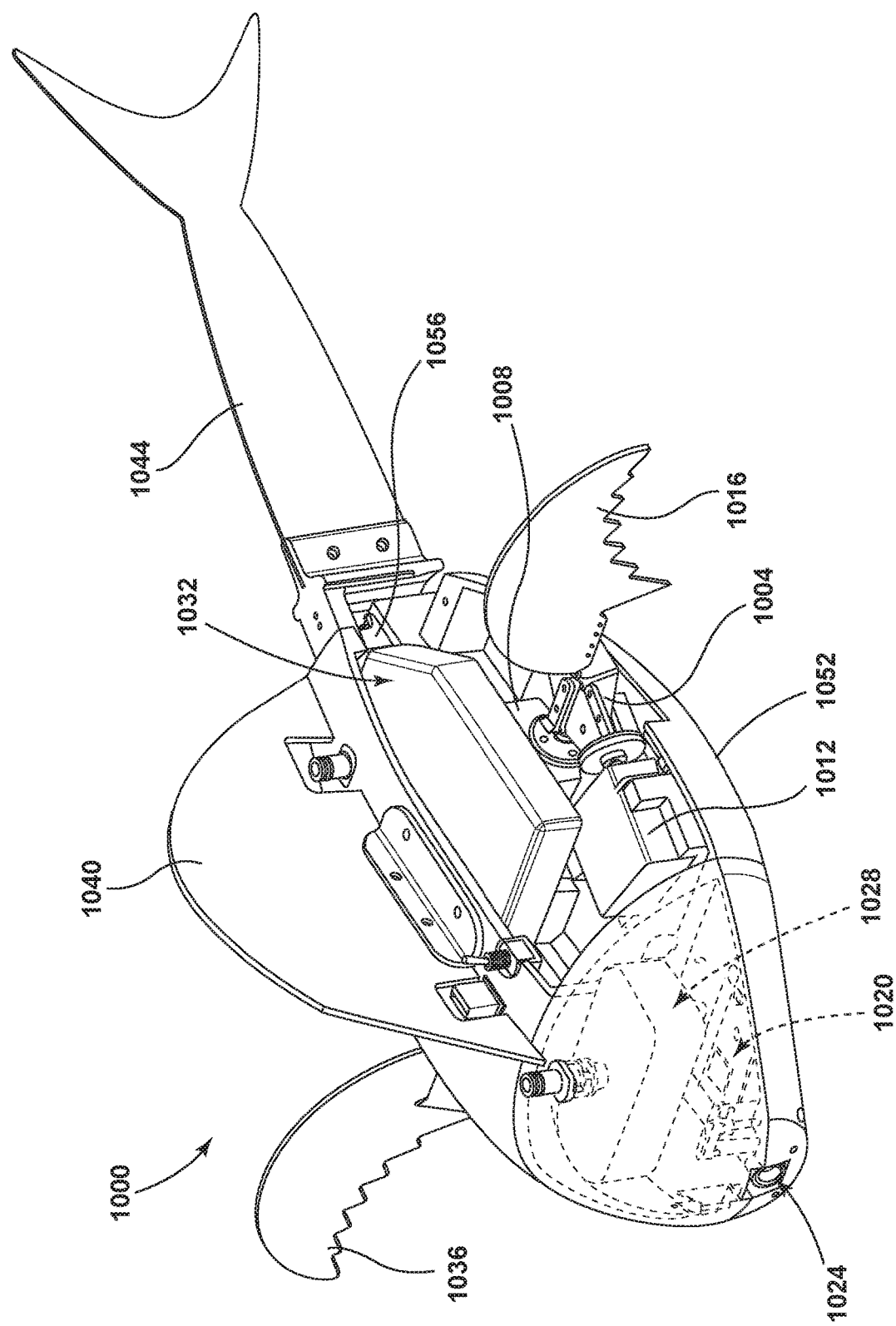
FIG. 10 is an exemplary robotic fish.

Referring now to FIG. 10, an exemplary robotic fish 1000 is shown. The robotic fish can include a body 1052 to which various components are coupled to and/or housed within. A portion of the body 1052 is shown cutaway to better depict internal components of the robotic fish 1000. The robotic fish can include a first five bar mechanism 1004 coupled to a first servo motor 1008 and a second servo motor 1012. The five bar mechanism can be formed with symmetric 72 degrees joint angles as shown in FIG. 9. The five bar mechanism 1004 can be coupled to a first pectoral fin 1016. The pectoral fin 1016 can be mounted in an upright position to the five bar mechanism 1004. More specifically, the pectoral fin 1016 can mounted in a position to extend orthogonally away from a bar included in the five bar mechanism 1004. In testing, this position has been shown to allow the pectoral fin 1016 to provide better maneuverability and turning radius for to the robotic fish 1000 than other mounting positions, even with the same fin design. A second pectoral fin 1036 can be coupled to a second five bar mechanism (not shown) coupled to two servo motors (not shown) and mounted to the second five bar mechanism in the same fashion as the first pectoral fin 1016 is mounted to the first five bar mechanism 1004. A third servo motor 1056 can be coupled to the body 1052 and coupled to a caudal fin 1044 that can provide locomotion for the robotic fish 1000 as will be described below. A controller 1020 such as a microcontroller (e.g., a Raspberry Pi Zero) can be mounted to the interior of the body 1052 and be coupled to and in communication with the servo motors 1008, 1012, and 1056 (and the servo motors coupled to the second five bar mechanism) in order to actuate the servo motors to cause the robotic fish 1000 to move through water. In some embodiments, the robotic fish 1000 can include one or more air bladders configured to provide a certain level of buoyancy to the robotic fish 1000. A camera 1024 can be coupled to the front of the body 1052 and be coupled to and in communication with the controller 1020 in order to record video and/or provide a live video stream to an operator of the robotic fish 1000. The controller 1020 can include and/or be coupled to a remote communication module (not shown) capable of transmitting data using a short range communication protocol such as WiFi, Zigbee, or Bluetooth and/or a long range communication protocol such as cellular or satellite communications. The controller 1020 may be configured to receive commands and/or be piloted by an external process using instruction received from the remote communication module. A dorsal fin 1040 can be coupled to the body 1052 in order to provide stability to the robotic fish 1000 when moving in potentially turbulent waters or other extreme environments. The robotic fish 1000 propels itself by using the pectoral fins 1016, 1036 and the caudal fin 1044.

Due to the ease of manufacturing, the body 1052 was constructed using 3D printed polylactic acid (PLA). The fins and joint transmissions can be constructed using by laminated techniques such as the layering technique described above in conjunction with FIG. 4. The robotic fish 1000 can achieve swimming speeds of 0.385 m/s (0.71 body length per second)-using the caudal fin 1044 and can perform pure rotation by utilizing the pectoral fins 1016, 1036. The turning speed in this rotation is 15.68 deg/s. The robotic fish 1000 is designed to be used in the maintenance of water canals with a width of as low as 3 feet. These canals have high currents and turbulence. In order to train the robotic fish to maneuver in this environment, a training workflow will be detailed below.

The robotic fish 1000 includes actuators have been commanded to follow sinusoidal patterns. This makes it possible to create motion with a small number of parameters, simplifying the training process. The servo motor commanding signals are defined as:

Right pectoral fin: $\theta_1 = \beta_1 + \alpha_1 \sin(2\pi f_1 t)$ $\theta_2 = \beta_2 + \alpha_2 \sin(2\pi f_2 t + \phi_1)$, Left pectoral fin: $\theta_3 = \beta_3 + \alpha_3 \sin(2\pi f_3 t)$ $\theta_4 = \beta_4 + \alpha_4 \sin(2\pi f_4 t + \phi_2)$, Caudal fin: $\beta_5 = \beta_5 + \alpha_5 \sin(2\pi f_5 t)$ (3)

where $\theta_i$ is actuators' angles $\beta_i$, $\alpha_i$, $f_i$, and $\phi_i$ are the sinusoidal signals' angular offset, amplitude, frequency and phase shift, respectively. The angles of the servo motors coupled to the second pectoral fin 1036 are a first actuator angle $\theta_1$ and a second actuator angle $\theta_2$. Similarly, the angle of the first servo motor 1008 and the angle of the second servo motor 1012 coupled to the first pectoral fin 1016 are to a third actuator angle $\theta_3$ and a fourth actuator angle $\theta_4$ respectively. The angle of the third servo motor 1056 coupled to the caudal fin 1044 is a fifth actuator angle $\theta_5$. There are 17 parameters to control the maneuver of the robotic fish fins. The controller 1020 can be configured to actuate the servo motors to the actuator angles $\theta_1$-$\theta_5$ using equation (3). The controller 17 can change at least a portion of the 17 parameters used to calculate the actuator angles $\theta_1$-$\theta_5$ based on a swimming mode of the robotic fish 1000, such as turning, straight-ahead locomotion, etc.

The parameter space was searched to find optimal gaits for individual swimming criteria. While the whole space may be searched for a low-dimensional space, a covariance matrix adaptation evolution strategy (CMA-ES) technique was utilized to find ideal parameters in a high-dimensional space for which finding global optimal solutions is nearly impossible. Testing was performed to evaluate more than one top-performing gait for a given maneuver (i.e. turning, straight-ahead locomotion, etc.) using the robotic fish 1000. The gait with consistently high-performing swimming across lab/outdoor environments can then selected for each swimming maneuver.

Turning

Being driven by the goal of maneuverability in tight spaces, a priority for the robotic fish 1000 is to minimize the turning radius. Using the pectoral fins 1016, 1036, the robotic fish 1000 can perform a 360-degree turn with a near zero radius. To train the robotic fish for sharp turns, a study has been carried out to maximize the amount of turning torque generated by the pectoral fin's propulsion. Turning performance has also been used as the selection criterion for selecting the fins' optimal attachment (for more details refer to material and methods section). The robotic fish 1000 achieves the best turning performance using both pectoral fins 1016, 1036 in conjunction with each other. Two different cases were considered in the search for the best gait's parameters. In the case of simulating still water, the robotic fish 1000 is coupled to a Universal Robots UR5 robotic arm, and the UR5 is stationary; however, in the second case, the UR5 is commanded to move along a straight path at 0.1 m/s to simulate current. In both cases, the test is repeated three times for each set of parameters.

The pectoral fins 1016, 1036 are parameterized in such a way that their motion is synchronized, but along an opposite path, meaning that when one is moving clockwise, the other one is moving counterclockwise. This is achieved by introducing following relationships:

$\alpha_1 = -\alpha_3, \alpha_2 = -\alpha_4, \beta_1 = -\beta_3, \beta_2 = -\beta_4, f_1 = f_2 = f_3 = f_4,$
$\phi_1 = \phi_2$ (4)

The relationships shown in equation (4) may allow the fins' motions to magnify generated torque rather than canceling them out. This assumption also reduces the gait parameter space by half, to seven from fourteen.

Based on the peak generated torques and repeatability, 8 unique gaits were selected for testing in real-world environments by the untethered robotic fish 1000 and the best motion gait was selected based on the performance in different environments. Using the best motion gait, the robotic fish 1000 can perform a 360-degree turn with a near zero radius and the average speed of 30.25 deg/s in the two foot wide experimental setup, despite the presence of turbulence caused by waves reflected by the tank wall. It should be mentioned that the caudal fin 1044 is detached to permit the robotic fish 1000 to turn in the tank without hitting walls. During testing in a pool, the turning speed was reduced to 15.68 deg/sec, however the motion gait can allow the robotic fish 1000 to reliably turn in the pool, even when the robotic fish 1000 is subjected to turbulence. The slower turning performance of robotic fish 1000 can be mostly attributed to addition of the caudal fin 1044 and the dorsal fin 1040 on the untethered robotic fish 1000.

For turning with a larger radius, robotic fish 1000 can utilize the pectoral fins 1016, 1036 in conjunction with the caudal fin 1044. While the robotic fish 1000 can use the gait selected above in combination with the caudal fin 1044 for larger-radius turning, a more energy-efficient approach is proposed to accomplish this goal. In this approach, the pectoral fins 1016, 1036 are commanded to move to different fixed configurations, producing different drag forces. This asymmetric drag on the body 1052 enables the robotic fish 1000 to turn gradually, while saving power by avoiding continuous actuation of the pectoral fin servos. As the objective is to find the configuration that maximizes turning torque at various speeds, individual tests are repeated three times per parameter set, once at 0.1, 0.2, and 0.3 m/s each. The cost function has been defined as the summation of average turning torque generated across all three speeds.

Swimming Forward

A series of studies have been run to improve the forward thrust generation and swimming speed of the robotic fish 1000 by finding the best gaits for both the caudal fin 1044 and the pectoral fins 1016, 1036. The next sections discuss several approaches for maximizing swimming speed, including minimizing body drag, optimizing the caudal fin gait, and learning whether the pectoral fins 1016, 1036 can contribute to thrust generation as well as for turning. Since a force-torque generation evaluation has been developed as the criteria for robotic fish performance, each study measures the amount of forces applied to the body 1052 of the robotic fish 1000 at different speeds using the experimental setup. This measurement enables us to understand the swimming performance of the robotic fish when moving freely. Body drag is measured by commanding the robotic arm to travel the tank length at a number of fixed speeds and at each speed, the average drag force on the body 1052 is sampled. It should be mentioned that in this test, all fins are in their neutral configuration ($\alpha_i=\beta_i=0$).

Body Drag Minimization

The pectoral fin configuration affects the amount of drag exerted on the robotic fish. The training algorithm has succeeded to reduce the sum of drag to 60 percent across different speeds by finding the optimum configuration of the pectoral fins 1016, 1036. The obtained results showed that the summation of drag value across all speeds has been reduced from 2.5N in neutral state to 1.5N in minimum-drag state. In order to minimize body drag, the training algorithm can be used to minimize drag by finding fixed servo positions that put both fins in an orientation that minimizes drag. The objective is to find the configuration that produces minimum drag across various speeds that the caudal fin 1044 can realistically achieve. Individual tests are repeated three times per parameter set, once at 0.1, 0.3, and 0.6 m/s each. The cost function has been defined as the summation of average drag exerted on the robotic fish in all mentioned speeds.

Forward Thrust Generation with the Caudal Fin

The robotic fish 1000 can swim forward with the maximum speed of 0.385 m/s by relying solely on the caudal fin 1044. This mechanism consists of a servo motor moving a flexible, fin-shaped plastic sheet back and forth to produce thrust. Experimental results show that the tail performs best when $\alpha_5=60$ deg and $f_5=1.4$ Hz. The thrust produced by the caudal fin 1044 is controllable when $f_5=1.4$ Hz. Hence, the motion of the caudal fin 1044 is therefore set to be symmetric ($\beta_5=0$). The three-dimensional space of function parameters ($\alpha_5$, $\beta_5$, and $f_5$) has been spanned by measuring the average of sampled thrust produced by the caudal fin 1044 across one cycle. Two different cases of pectoral fin orientations have also been considered throughout the caudal fin study. These cases are neutral and minimum-drag orientations of the pectoral fins 1016, 1036. The maximum thrust produced by the caudal fin 1044 increases by almost 15 percent when the pectoral fins 1016, 1036 have been moved from their neutral to the minimum-drag configuration. After fitting drag and thrust generation plots, it was estimated that the caudal fin 1044 can achieve a forward velocity of 0.16 and 0.18 m/s when the pectoral fins 1016, 1036 are in their neutral and minimum-drag configurations, respectively. Considering that the robotic fish has attachments that increase drag during laboratory experiments, the swimming speed achievable by the un-tethered robotic fish is expected to be more than the value that has been estimated by matching the body drag and the thrust generation of the caudal fin 1044.

Forward Thrust Generation with Caudal and Pectoral Fins

The purpose of this next study is to improve forward thrust by utilizing the propulsion of the pectoral fins 1016, 1036. The obtained results show that in the current design and configuration, the pectoral fins 1016, 1036 are not capable of improving the thrust produced by the caudal fin 1044. Different cases have been considered for this objective. In the initial case, an unconstrained full search was performed. This has resulted in a gait search in the 16-dimensional parameters space (two for symmetric caudal fin propulsion and two sets of seven variables for each pectoral fin). In this test, the UR5 moving speed is 0.1 m/s. The obtained results showed that the training algorithm did not converge after one hundred iterations. Considering that on average, each iteration takes a hundred minutes, the study has not been carried out for more iterations. Instead, some simplifications have been applied to help the training algorithm to converge. The caudal fin 1044 has been set to produce maximum forward thrust and the pectoral fins 1016, 1036 have been commanded in a way that they have symmetric propulsions. This is achieved by introducing following relationships:

$$\alpha_1=\alpha_3,\ \alpha_2=\alpha_4,\ \beta_1=-\beta_3,\ \beta_2=-\beta_4,\ f_1=f_2=f_3=f_4,\ \phi_1=\phi_2 \qquad (5)$$

For each set of parameters, the test is repeated three times while the UR5 moving speed is set to 0.1 m/s. The obtained results showed that all tested gaits have values less than the thrust achievable by the caudal fin 1044 alone. Finally, another case has also been studied to evaluate the ability of the thrust generation of swimming with the pectoral fins 1016, 1036 with the caudal fin 1044 disabled. The highest performing gait is only capable of overcoming the body drag of the robotic fish 1000 when the UR5 is commanded to move the fish at 0.1 m/s speed. This result shows that the symmetric propulsion of the pectoral fins 1016, 1036 can produce only limited forward thrust in certain circumstances; the maximum speed achievable is around 0.1 m/s.

Figure 11:
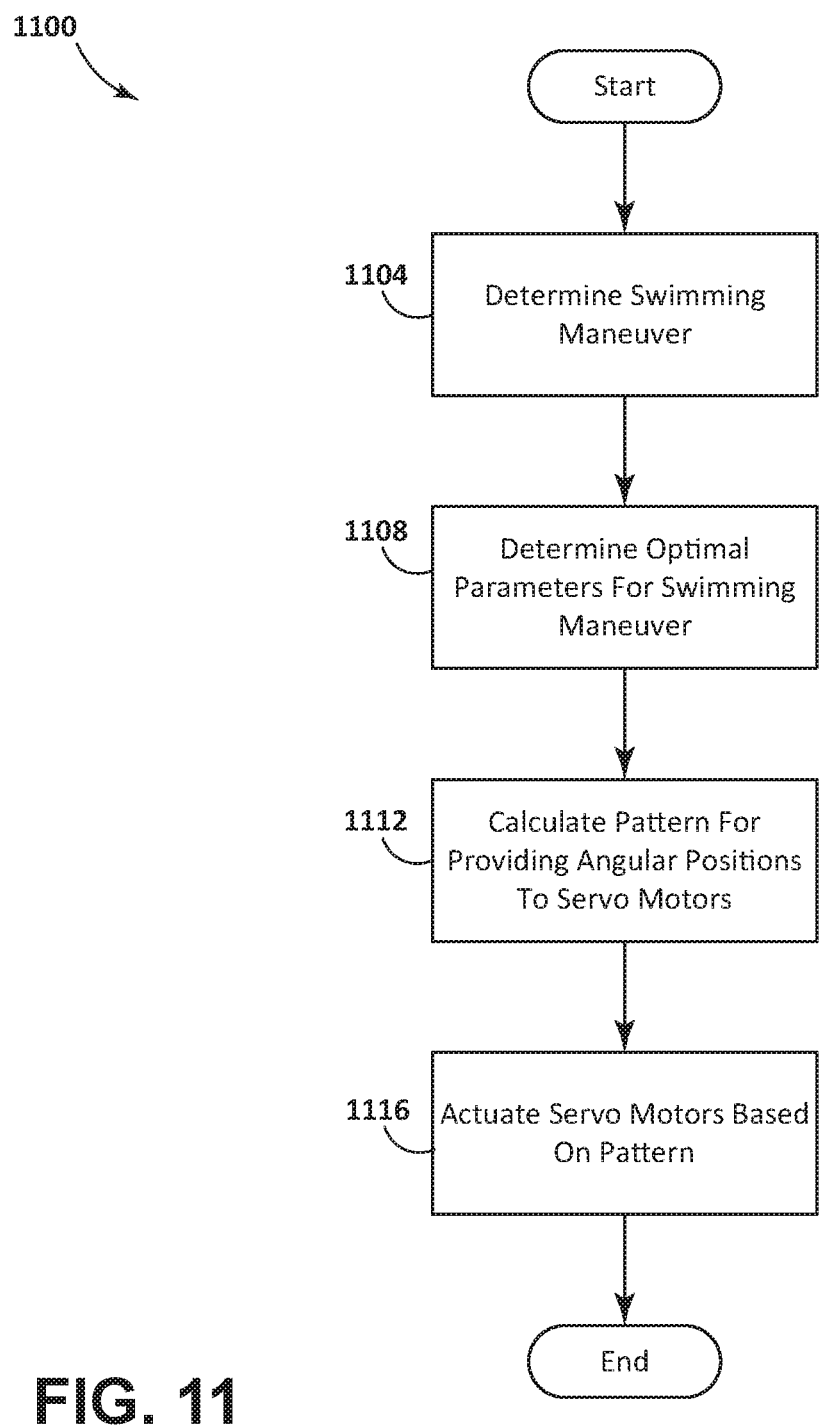
FIG. 11 is a process for controlling actuators coupled to parallel mechanisms and/or caudal fins in a robotic fish.

Referring now to FIG. 10 as well as FIG. 11, a process 1100 for controlling actuators coupled to parallel mechanisms and/or caudal fins in a robotic fish is presented. The process 1020 can be stored as instruction on a memory included in or coupled to the controller 1020 and executed by one or more processors included in the controller 1020 in order to control components of the robotic fish 1000 described above.

At 1104, the process can determine a swimming maneuver. The swimming maneuver can be forward swimming or turning. The process 1100 may receive a command indicative of the swimming maneuver from a remote source via the remote communication module described above. The swimming maneuver can be predetermined. The process can then proceed to 1108.

At 1108, the process 1100 can determine optimal parameters for the swimming maneuver for the first servo motor 1008, the second servo motor 1012, the third servo motor 1056, and the two servo motors coupled to the five bar mechanism coupled to the second pectoral fin 1036. The process 1100 can access predetermined optimal parameters such as the angular offsets, amplitudes, frequencies and phase shifts included in equation (3) above that correspond to the swimming maneuver. Different maneuvers may have different optimal parameters. The process 1100 can then proceed to 1112.

At 1112, the process 1100 can calculate a pattern for providing angular positions to the servo motors using equation (3). Using the optimal parameters, the process 1100 can calculate a series of angular positions ($\theta_i$ in equation (3)) for a number of time points. The pattern can be sinusoidal. The process 1100 can then proceed to 1116.

At 1116, the process 1100 can actuate the servo motors based on the pattern. The process 1100 can actuate the servo motors to the angular position specified by the pattern at each time point and cause the robotic fish 1000 to turn, swim forward, etc. The process 1100 can then end.

The present invention has been described in terms of one or more preferred embodiments, and it should be appreciated that many equivalents, alternatives, variations, and modifications, aside from those expressly stated, are possible and within the scope of the invention

We claim:

1. A device for providing propulsion in water, the device comprising:
   a parallel mechanism comprising at least five rigid bars and at least five joints, each joint being positioned between two of the rigid bars and configured to allow movement of the at least five rigid bars;
   a first servo motor coupled to a first rigid bar included in the at least five rigid bars;
   a second servo motor coupled to a second rigid bar included in the at least five rigid bars; and
   a controller coupled to the first servo motor and the second servo motor and configured to actuate the first servo motor and the second servo motor according to a predetermined pattern.

2. The device of claim 1, wherein the at least five joints are evenly spaced around the parallel mechanism.

3. The device of claim 1, wherein the at least five joints comprise a fabric.

4. The device of claim 1, wherein the predetermined pattern includes a sinusoidal pattern.

5. The device of claim 1, wherein a third rigid bar included in the at least five rigid bars is coupled to a substrate, the third rigid bar being positioned between the first rigid bar and the second rigid bar, and wherein the first servo motor and the second servo motor are coupled to the substrate.

6. The device of claim 5, wherein the third rigid bar is attached to the substrate via a structural member.

7. The device of claim 5 further comprising a fin attached to a fourth bar of the at least five rigid bars and extending orthogonally away from the parallel mechanism, the fourth bar positioned adjacent to the first rigid bar, and the fourth bar moving when the first rigid bar moves.

8. The device of claim 1, wherein the pattern is determined based on predetermined parameters corresponding to a swimming maneuver, and wherein the predetermined pattern comprises a series of angular positions for the first servo motor and the second servo motor.

9. The device of claim 1, wherein the device is included in a robotic fish.

10. The device of claim 1, wherein the at least five joints comprise nylon.

11. The device of claim 1 further comprising a fin coupled to a third rigid bar included in the at least five rigid bars.

12. The device of claim 11, wherein the fin is configured to provide a turning force to a submersible robot.

13. The device of claim 11, wherein the fin is configured to provide a locomotion force to a submersible robot.

14. A robotic fish comprising:
   a parallel mechanism comprising at least five rigid bars;
   a first servo motor coupled to a first rigid bar included in the at least five rigid bars;
   a second servo motor coupled to a second rigid bar included in the at least five rigid bars;
   a fin coupled to a third rigid bar included in the at least five rigid bars; and
   a controller coupled to the first servo motor and the second servo motor and configured to actuate the first servo motor and the second servo motor according to a predetermined pattern in order to provide a turning force to the robotic fish.

15. The robotic fish of claim 14, wherein the parallel mechanism comprises at least five joints, each joint being positioned between two of the rigid bars and configured to allow movement of the at least five rigid bars.

16. The robotic fish of claim 15, wherein the at least five joints are evenly spaced around the parallel mechanism.

17. The robotic fish of claim 15, wherein the at least five joints comprise a fabric.

18. The robotic fish of claim 14, wherein the predetermined pattern includes a sinusoidal pattern.

19. The robotic fish of claim 14 further comprising a caudal fin coupled to a third servo motor, wherein the controller is further coupled to the third servo motor and configured to actuate the third servo motor in a second predetermined pattern in order to provide a locomotion force to the robotic fish.

20. The robotic fish of claim 14, wherein the fin extends orthogonally away from the parallel mechanism.

* * * * *

UNITED STATES PATENT AND TRADEMARK OFFICE
CERTIFICATE OF CORRECTION

PATENT NO. : 11,124,281 B2
APPLICATION NO. : 16/655018
DATED : September 21, 2021
INVENTOR(S) : Daniel Aukes et al.

Page 1 of 1

It is certified that error appears in the above-identified patent and that said Letters Patent is hereby corrected as shown below:

In the Specification

Column 9, Line 39, "angles $\beta_i$;" should be -- angles and $\beta_i$ --.

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*